Figure 1:
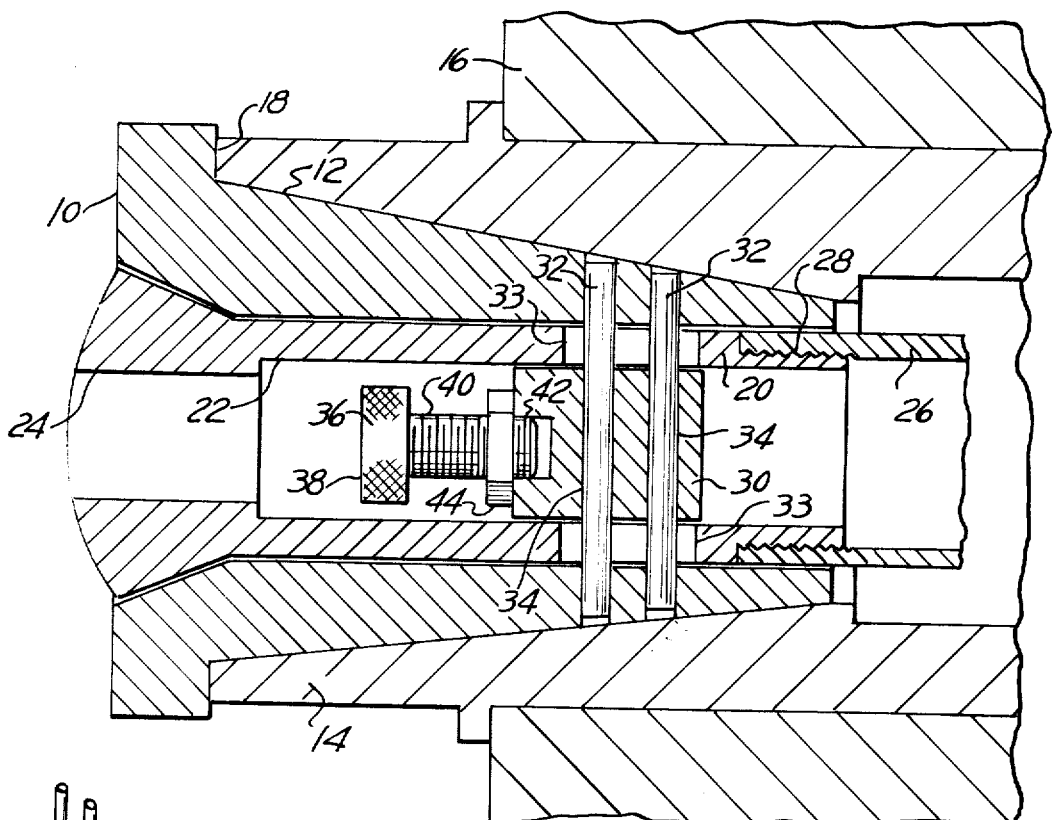

United States Patent [19]
Blanchard

[11] 3,876,214
[45] Apr. 8, 1975

[54] COLLET WITH ADJUSTABLE WORKSTOP
[76] Inventor: Vernon F. Blanchard, 25916 W. Seven Mile Rd., Detroit, Mich. 48240
[22] Filed: Mar. 20, 1974
[21] Appl. No.: 453,108

[52] U.S. Cl............................ 279/1 S; 82/34 C
[51] Int. Cl...................... B23b 31/20; B23b 13/12
[58] Field of Search ........... 279/1 S, 51; 82/34 C; 408/239 A; 90/11 D

[56] References Cited
UNITED STATES PATENTS
2,469,160  5/1949  Evans.......................... 82/34 C X
2,771,297  11/1956  Nipken ........................ 279/1 S

*Primary Examiner*—Gil Weidenfeld
*Attorney, Agent, or Firm*—Krass & Young

[57] ABSTRACT

A work holder for a lathe employs a collet having one end secured to the draw bar of the lathe so as to move the collet within an adapter having a complementary tapered surface. A work stop for controlling the depth of insertion of work within the collet is disposed within the collet and retained by pins which have their ends secured at diametrically opposed points in the adapter and pass through slots in the collet to maintain the stop at a fixed position with respect to the machine independent of axial motion of the collet.

6 Claims, 2 Drawing Figures

COLLET WITH ADJUSTABLE WORKSTOP

BACKGROUND OF THE INVENTION

1. Field of the Invention

This invention relates to collets for retaining work within rotary spindle machines having stop means for controlling the depth of insertion of work in the collet.

2. Background of the Invention

My U.S. Pat. No. 3,720,416 granted Mar. 13, 1973 discloses a work stop adapted to control the length of insertion of workpieces into the collet of a machine tool such as a lathe independently of variations in the outer diameters of the workpieces. That stop extends through the draw bar of the machine into the collet area and is fixed with respect to the spindle against axial motion with the draw bar. The stop is axially adjustable so that the depth of insertion of workpieces can be controlled to a precise point within the range of motion of the stop. The stop rotates with the spindle so it can be used with parts that have finished ends without abrading those surfaces and is removable progressively fed through the collet from the rear of the machine.

While that stop device has proven to be very advantageous compared to previously available stop devices, it represents certain problems in its application to existing machines and in its day-to-day use. In particular, it requires use of a specially configured draw bar since the work stop support must be fixed relative to the spindle yet slidable relative to the draw bar within which it is disposed. Additionally the use of my previous draw bar requires a special stop support be affixed within the spindle area. While it is possible to convert existing machines to the use of that arrangement, conversion is relatively expensive.

Another problem encountered in the use of the work stop described in my previous patent is the necessity of setting up the stop to a control position while it is in the machine. This has proved to be a relatively time consuming procedure.

SUMMARY OF THE PRESENT INVENTION

The present invention is directed to a collet equipped with an adjustable work stop which overcomes these two disadvantages of my previous invention. Namely, the present device is self-contained within the collet assembly and is therefore adaptable to use with any turning machine which can employ a collet-type workholder. Additionally, the present device is arranged so that the position of the workstop may be adjusted on a work bench before the collet assembly is inserted in the machine. No adjustments need be made at the machine itself. These advantages render the present workstop much easier to apply and use in the field. While the depth of adjustment of the present stop is inherently more limited than that of the stop of my previous patent, in many applications that depth of adjustment is not required and the advantages which accrue to the present arrangement may still be enjoyed.

Broadly, the present invention comprises a workstop adapted to be supported centrally within the collet area so as to rotate with the collet but maintain a stationary position independent of the axial motion of the collet. The stop is secured by pins that have their ends fixed in diametrically opposed points on the collet adapter and pass through a pair of axial slots formed in diametrically opposed points on the collet. The slots in the collet allow the collet to displace axially without moving the stop. The stop includes a threaded section which is axially adjustable and may be secured in position with a lock nut, before insertion of the collet assembly in the machine, to control the depth of workpiece insertion.

The present work stop arrangement is therefore integral with the collet assembly and may be used with any machine that can receive the collet assembly without any modification of the machine. The work stop can be removed from the collet assembly to allow the collet to be used with bar stock or with work pieces which must extend rearwardly into the draw-bar area. The stop rotates with the collet so that a finished work piece surface may be brought into abutment with the stop without marring that surface.

Figure 2:
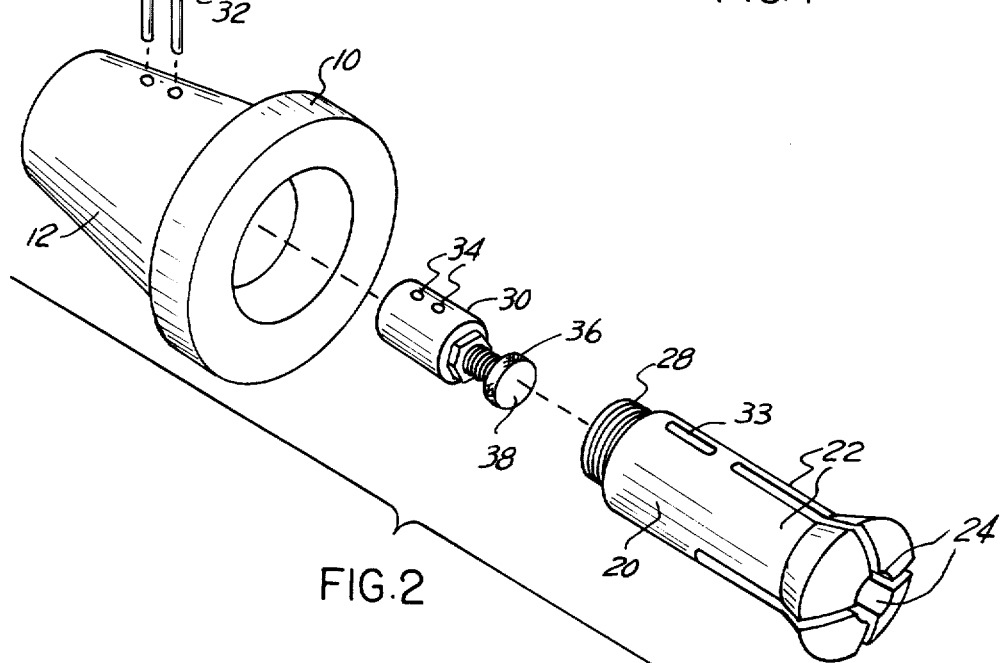

Other objectives, advantages and applications of the present invention will be made apparent in the following detailed description of the preferred embodiment of the invention. The description makes reference to the accompanying drawings in which:

FIG. 1 is a sectional view through a collet assembly formed in accordance with the present invention and disposed in the spindle of a lathe; and FIG. 2 is a perspective exploded view of the components of the preferred embodiment of the collet.

Referring to the drawings, the collet assembly is housed within a generally cylindrical collet adapter 10. The adapter has a tapered outer surface 12 which is adapted to be pressed fitted within a complementary internal tapered surface formed on the spindle 14 of a machine such as lathe. The spindle 14 is rotatably supported within the stationary housing 16 of the machine and is suitable powered for rotation in a conventional manner. The adapter 10 has a forward flange with rear facing shoulder 18 that abuts the forward end of the spindle 14 to accurately position the adapter in the spindle.

A cylindrical collet 20 has a plurality of segmented fingers 22 having internal cylindrical workpiece engaging surfaces 24 formed thereon. The collet is adapted to be connected to a draw-bar 26 forming part of the operating machine by means of a threaded extension 28 formed on the rear section of the collet, which engages a complementary internal thread on the forward end of the draw bar 26. The collet 20 is disposed within the collet adapter 10 and their two complementary surfaces are tapered downwardly toward the rear in the conventional manner so that when the collet 20 is fully withdrawn within the adapter 10 by the draw bar 26, the work piece engaging surfaces 24 of the collet close about a suitable cylindrical workpiece inserted within the collet and when the draw bar moves the collet forward, out of the adapter 10, the fingers 22 spring outwardly, releasing the workpiece.

As herefore described, the collet and adapter are of a conventional construction. The novelty of the collet assembly resides in the provision of the work stop within the collet and in the manner of supporting that work stop.

A cylindrical work stop retainer 30 makes a loose sliding fit with the internal diameter of the collet 20. It is supported centrally within the collet by a pair of pins 32 which are staggered axially with respect to one another and have their ends affixed in holes formed at diametrically opposed points in the collet adapter 10 so that the pins extend radially with respect to the adapter. The pins 32 pass through axially alligned elongated slots 33 which are formed at diametrically opposed points on the collet 20, and fit in a pair of holes 4 formed radially through the stop retainer 30. The ends of the pins 32 do not project beyond the outer tapered surface 12 of the adapter and thus allow the adapter to be used with a conventional tapered spindle. A cylindrical work stop 36 having an outer diameter which is smaller than the outer diameter of the retainer 30, and having finished forward work stop face 38, is supported in the retainer 30 by means of an externally threaded neck 40 which mates with an internally threaded recess 42 formed in the forward end of the retainer 30. The extension of the work stop surface 38 from the retainer 30 may be adjusted by means of the threaded connection 42 and a lock nut 44 retains the stop 36 in a previously adjusted position.

The work stop 38 and its retainer 30 are rotated with the adapter 10 through its pinned connection therewith. However, the pins 32 retain the work stop against axial motion of the collet 20 induced by the draw bar 26. The slots 33 are sufficiently long so that the collet may undergo full axial motion between an open and closed position without impact between the pins 32 and the slots 33.

The position of the work stop surface 38 relative to the adapter 10 may be adjusted before the assembly is inserted in the machine spindle by tapping out the pins 32 and removing the work stop retainer 30 and the work stop 36 from the rear end of the collet. The extension of the stop 36 beyond the retainer 30 may then be fixed by the stop nut 44. Since the retainer 30 is fixed with respect to the adapter 10 and the adapter is positioned in the spindle by the shoulder 18, this controls the position of the work stop surface 38 relative to the spindle. The retainer 30 is then inserted into the collet through the rear end and the pins 32 are replaced. The collet assembly may then be inserted in a tapered spindle 14 and cylindrical work pieces are inserted into the open collet until they abut the stop surface 38. The draw bar 26 is then retracted, locking the work-piece in the collet at this controlled extension.

Having thus described my invention I claim:

1. A work holder for a machine having a rotary spindle and a draw bar supported for rotation within the spindle and for motion along the axis of rotation of the spindle, comprising: a cylindrical adapter operative to be secured to the spindle for rotation with the spindle; a collet supported within the adapter and having means formed on one of its ends for securement to the draw bar so that axial movement of the draw bar moves the collet between a first position within the adapter wherein the collet is open to receive work and a second position within the adapter wherein the collet is closed so as to engage a workpiece inserted within the collet; at least a pair of elongated slots formed in diametrically opposed surfaces of the collet and extending parallel to the direction of motion of the collet; a retaining pin having its opposed ends fixed within the adapter at a pair of diametrically opposed points and extending through said slots in the collet; and a work stop fixed to said retainer pin, within the collet, said stop having a work engaging surface facing the work receiving end of the collet so that a workpiece inserted within the collet abuts said work engaging surface to control the depth of insertion of the workpiece within the collet.

2. The work holder of claim 1 wherein the stop member includes a first part secured to said pin and said work engaging surface is formed on a second part of the stop member which is adjustably secured within said first part so as to control the position of said work stop surface within the spindle.

3. The work retainer of claim 2 wherein the second part of the stop member containing the work engaging surface is threadable within an aperture formed in the first part of the stop member and a lock nut is employed to secure the second part in a particular extending position from said first part.

4. The work holder of claim 1 wherein the work stop is retained within said collet and adapter by a pair of pins displaced relative to one another axially with respect to the adapter.

5. A collet assembly for use with a machine having a tapered spindle and a draw bar supported for rotation with the spindle and for motion along the axis of rotation of the spindle; a collet having a plurality of elongated fingers formed at one end and a draw bar engaging section at the opposite end supported within the spindle for axial motion relative to the spindle between an extending position wherein the fingers are open to receive a workpiece and a retracted position wherein the fingers close about a workpiece; a pair of elongated slots passing through diametrically opposed surfaces of the collet and extending axially relative to the motion of the collet with respect to the spindle; a work stop member having a stop surface extending normally to the axis of the collet disposed within the collet; and elongated retainer means having opposed ends affixed in diametrically opposed points with respect to the spindle and extending through said slots in the collet and retaining said work stop within the collet in a manner fixed against axial motion with respect to the spindle.

6. The collet assembly of claim 5 wherein the work stop includes a pair of sections adjustable relative to one another so as to control the position of said stop surface relative to said spindle.

* * * * *